(12) United States Patent
Herwig

(10) Patent No.: US 10,296,902 B2
(45) Date of Patent: May 21, 2019

(54) PAYMENT DEVICE WITH DATA ENTRY KEYS

(71) Applicant: NCR Corporation, Duluth, GA (US)

(72) Inventor: Nathaniel C. Herwig, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/672,685

(22) Filed: Mar. 30, 2015

(65) Prior Publication Data

US 2016/0253638 A1    Sep. 1, 2016

Related U.S. Application Data

(60) Provisional application No. 62/126,100, filed on Feb. 27, 2015.

(51) Int. Cl.
  *G06Q 20/38*  (2012.01)
  *G07F 7/10*  (2006.01)

(52) U.S. Cl.
  CPC ......... *G06Q 20/382* (2013.01); *G07F 7/1033* (2013.01); *G06Q 2220/00* (2013.01)

(58) Field of Classification Search
  None
  See application file for complete search history.

(56) References Cited

U.S. PATENT DOCUMENTS

| | | | | |
|---|---|---|---|---|
| 5,970,146 A * | 10/1999 | McCall | ................. | G06F 3/0416 345/173 |
| 8,261,064 B2 * | 9/2012 | Ditzman | ................. | G06F 21/83 178/18.01 |
| 9,760,739 B2 * | 9/2017 | Ninomiya | ............... | G06F 21/84 |
| 2004/0024710 A1 * | 2/2004 | Fernando | ............ | G06F 21/6218 705/50 |
| 2005/0073446 A1 * | 4/2005 | Lazaridis | .............. | G06F 3/0202 341/22 |
| 2009/0117935 A1 * | 5/2009 | Gredvall | ............. | H04W 52/027 455/550.1 |
| 2011/0260977 A1 * | 10/2011 | Frank | .................... | G06F 1/1626 345/168 |
| 2014/0015637 A1 * | 1/2014 | Dassanayake | ..... | G07C 9/00174 340/5.54 |
| 2015/0160691 A1 * | 6/2015 | Kadah | .................... | G05B 15/02 345/174 |
| 2015/0320209 A1 * | 11/2015 | Hasselback | ............ | A47B 81/00 348/151 |

\* cited by examiner

*Primary Examiner* — Christle I Marshall
(74) *Attorney, Agent, or Firm* — Schwegman, Lundberg & Woessner

(57) ABSTRACT

A payment device with data entry keys which are obscured from view when not in use. An example payment device includes a plurality of data entry keys for recording data during a transaction, and a backlight for illuminating the data entry keys. A secure controller is configured to activate the backlight to reveal locations of the data entry keys for data entry, receive and encrypt entered data from the data entry keys, and to deactivate the backlight following the data entry.

28 Claims, 4 Drawing Sheets

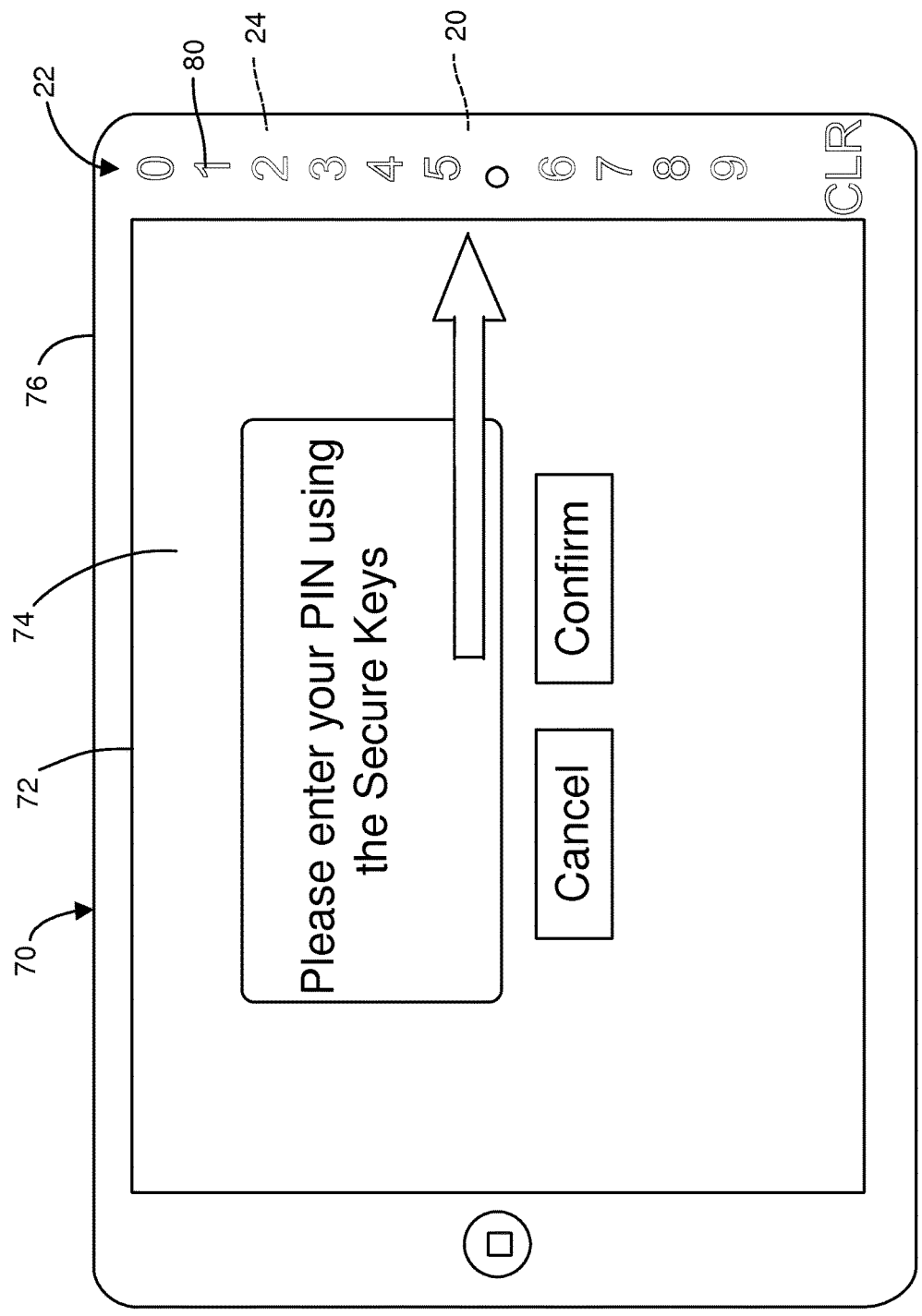

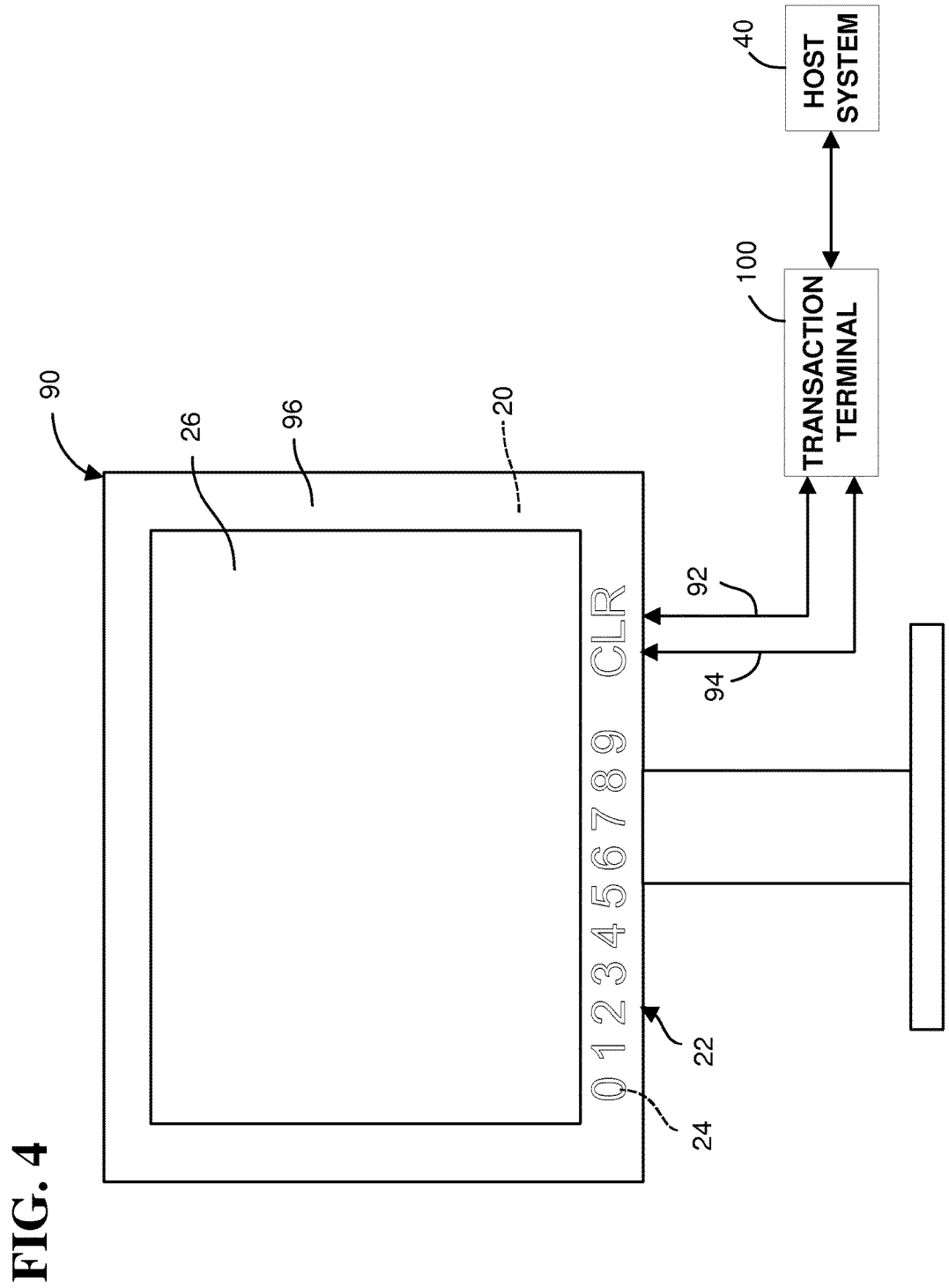

PAYMENT DEVICE WITH DATA ENTRY KEYS

BACKGROUND

The present invention relates to payment peripherals and more specifically to a payment device with data entry keys.

Electronic payment terminals with PIN entry keypads are expensive to produce and secure. Touchscreens are an alternative input device; however, current regulations make it difficult to accept PIN numbers on a touchscreen, both for security and for accessibility reasons. Choices for data entry devices are otherwise limited.

It would be desirable to provide an inexpensive but secure data entry device and method of entering data during a transaction.

SUMMARY

In accordance with the teachings of the present invention, a payment device with data entry keys is provided.

An example payment device includes a plurality of data entry keys for recording data during a transaction, and a backlight for illuminating the data entry keys. The data entry keys are substantially obscured when the backlight is deactivated. The example payment device further includes a secure controller configured to activate the backlight to reveal locations of the data entry keys for data entry, receive and encrypt entered data from the data entry keys, and to deactivate the backlight following the data entry.

An example payment device includes a display portion, a bezel around the display portion, a plurality of data entry keys within the bezel for recording data during a transaction, and a backlight within the bezel for illuminating the data entry keys. The data entry keys are substantially obscured when the backlight is deactivated. The example payment device further includes a secure controller configured to encrypt the data.

An example payment device includes a tablet computer including a display portion, a bezel around the display portion, a plurality of capacitive data entry keys within the bezel for recording data during a transaction, a backlight within the bezel for illuminating the data entry keys. The data entry keys are substantially obscured when the backlight is deactivated. The tablet computer further includes a first controller and a second controller. The first controller is a secure controller configured to activate the backlight to reveal locations of the capacitive data entry keys for data entry, encrypt the data, and deactivate the backlight following the data entry. The second controller is configured to complete the transaction, including receiving the encrypted data from the first controller and sending the encrypted data to a host computer. The first controller may additionally be configured to enable the keys from a normally disabled state for the data entry and disable the keys following the data entry.

An example transaction data entry method includes activating a backlight to reveal locations of data entry keys for data entry by a secure controller. The data entry keys are substantially obscured when the backlight is deactivated. The method further includes obtaining entered data from the data entry keys by the secure controller, encrypting the entered data to form encrypted data by the secure controller, sending the encrypted data to a transaction controller by the secure controller, and deactivating the backlight to obscure the data entry keys by the secure controller. The method may further include enabling the data entry keys from a normally disabled state for the data entry by the secure controller, and disabling the data entry keys following the data entry by the secure controller.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is an example payment device; and

FIG. 4 is another example payment device.

DETAILED DESCRIPTION

Figure 1:
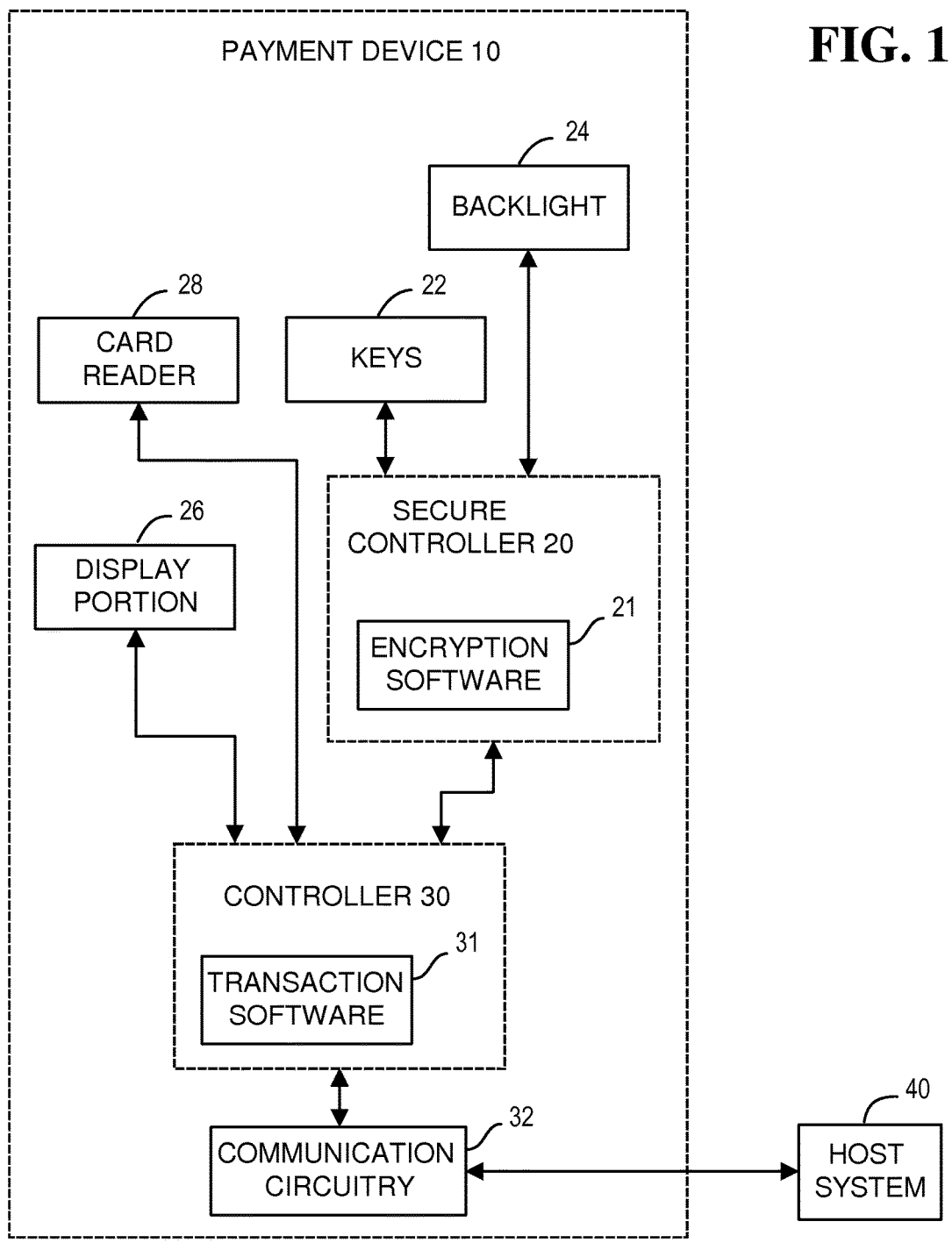
FIG. 1 is a block diagram of an example payment device.

With reference to FIG. 1, an example payment device 10 includes keys 22. Keys 22 record sensitive data from keystrokes, such as personal identification numbers (PINs), Social Security numbers, driver's license numbers, and other sensitive information entered by an operator. The sensitive information may include numbers, letters, or a combination of both.

An example configuration specifically for PIN entry may include the digits 0-9, an "Enter" key to enter a sequence of numbers, a "Clear" key to clear one or more selected numbers, and a "Cancel" key to cancel a data entry operation.

In one example embodiment, keys 22 may include capacitive data entry keys.

In an example embodiment, payment device 10 may additionally include a backlight 24 for illuminating keys 22.

In an example embodiment, keys 22 are substantially hidden or obscured from view when backlight 24 is deactivated, offering a cleaner and less confusing user interface. Keys 22 blend in with their surroundings and are not easily distinguishable from them. Activation of backlight 24 reveals keys 22 and identifies to an operator where keys 22 are located.

Example payment device 10 further includes one or more controllers, including a secure controller 20 which encrypts sensitive data, such as PIN data. For this purpose, secure controller 20 may store one or more encryption keys and execute encryption software 21.

Secure controller 20 may turn on backlight 24 at a point when entry of sensitive data is required during a transaction and turn off backlight 24 following data entry.

In an example embodiment, secure controller 20 may also enable keys 22 when entry of sensitive data is required during a transaction and disable keys 22 following data entry.

Example payment device 10 may additionally include display 26, which may include a liquid crystal display (LCD). In an example embodiment, display 26 may be combined with a touch-sensitive overlay to form a touch screen.

Example payment device 10 may additionally include additional peripherals, such as card reader 28. In one example embodiment, card reader 28 may be configured to encrypt payment card data and provide encrypted payment card data directly to controller 30. For this purpose, card reader 28 may include its own encryption software. In another example embodiment, secure controller 20 encrypts payment card data from card reader 28.

Payment device 10 may include other peripherals, such as a signature capture device, and when they are connected to secure controller 20, secure controller 20 may encrypt data from those peripherals, e.g., signature data.

Example payment device 10 may additionally include communications circuitry 32 for connecting payment device 10 to host computer 40. Host computer 40 facilitates payment using the encrypted data.

In one embodiment, communications circuitry 32 may include networking circuitry, wired or wireless. In another embodiment, communications circuitry 32 may include Bluetooth standard wireless circuitry, such as the embodiment of FIG. 3. In another embodiment, communications circuitry 32 may include universal serial bus (USB) circuitry, such as the embodiment of FIG. 4. In other embodiments, communications circuitry 32 may include any combination of these types of communication circuitry.

Example payment device 10 may further include controller 30. Controller 30 includes a transaction controller which may execute transaction software 31 for completing transactions that may require a user to input sensitive data.

In one example embodiment, transaction software 31 displays transaction screens for guiding a user through a transaction. During a transaction, transaction software 31 may display indicators directing operator attention to keys 22.

In one example embodiment, transaction software 31 sends commands to secure controller 20 to facilitate user input. Example commands may include an enable secure input command, a get secure input command, and a disable secure input command.

Transaction software 31 may send the enable secure input command to initiate user input. In response, secure controller 20 activates backlight 24.

Secure controller 20 may also enable keys 22 for input, from a normally disabled state, in response to the enable secure input command. Alternatively, transaction software 31 may send different commands to enable keys 22 and then activate backlight 24. For example, secure controller 20 may send a command to a keypad controller associated with keys 22 to enable keys 22.

Transaction software 31 may send the get secure input command to get encrypted user input data from secure controller 20. In response, secure controller 20 gets user input data from keys 22, encrypts the user input data, and returns the encrypted user input data to transaction software 31.

Transaction software 31 sends a disable secure input command to disable user input. In response, secure controller 20 deactivates backlight 24.

Secure controller 20 may also disable keys 22 in response to the disable secure input command, to return keys 22 to a normally disable state. Alternatively, transaction software 31 may send different commands to deactivate backlight 24 and then disable keys 22. For example, secure controller 20 may send another command to the keypad controller associated with keys 22 to disable keys 22.

In one example embodiment, transaction software 31 may include software to communicate commands to secure controller 20 and get encrypted user input data from secure controller 20.

In another example embodiment, transaction software 31 may interact with other software, e.g., middleware, to communicate commands to secure controller 20, get encrypted user input data, and securely manage other aspects of the payment process.

Controller 30 may include one or more processors, memory, and program storage. Controller 30 may execute an operating system such as a Microsoft, Google, or Apple operating system. Controller 30 may execute software which is stored in a computer readable medium, such as a memory. In one example embodiment, transaction software 31 may include a native mobile application.

Controller 30 may additionally establish a secure connection with host system 40. Various secure protocols and encryption methods may be employed by controller 30 to establish a secure connection between payment device 10 and host computer 40. For example, payment device 10 may establish a secure shell (SSH) network connection with host computer 40. As another example, transaction software 31 may be written as a web application and use Hypertext Transfer Protocol (HTTP) on top of the Secure Socket Layer/Transport Layer Security (SSL/TLS) protocol.

In one example embodiment, payment device 10 may include a dedicated payment peripheral, such as a PIN entry keypad. Such a peripheral may include at least secure controller 20 and data entry keys 22, and communication circuitry 32. Communication circuitry 32 may include USB or network circuitry.

In another example embodiment, payment device 10 may include a payment peripheral with more than one data entry function, such as reading of payment cards or capturing of signatures. Such a peripheral may include at least secure controller 20 and communication circuitry 32, and another peripheral. Communication circuitry 32 may include USB or network circuitry.

In another example embodiment, payment device 10 may include a device with an integrated payment peripheral, such as computing device with an integrated payment peripheral (FIG. 3).

For example, payment device 10 may include a secondary point of sale display device, i.e., one that a customer might use, which is configured, for example, to include keys 22 and secure controller 20, and to be controlled by a separate transaction controller 100 (FIG. 4).

Thus, computers and other peripherals that are not normally used as payment devices may become payment devices by incorporating keys 22, secure controller 20, and optionally, backlight 24.

Figure 2:
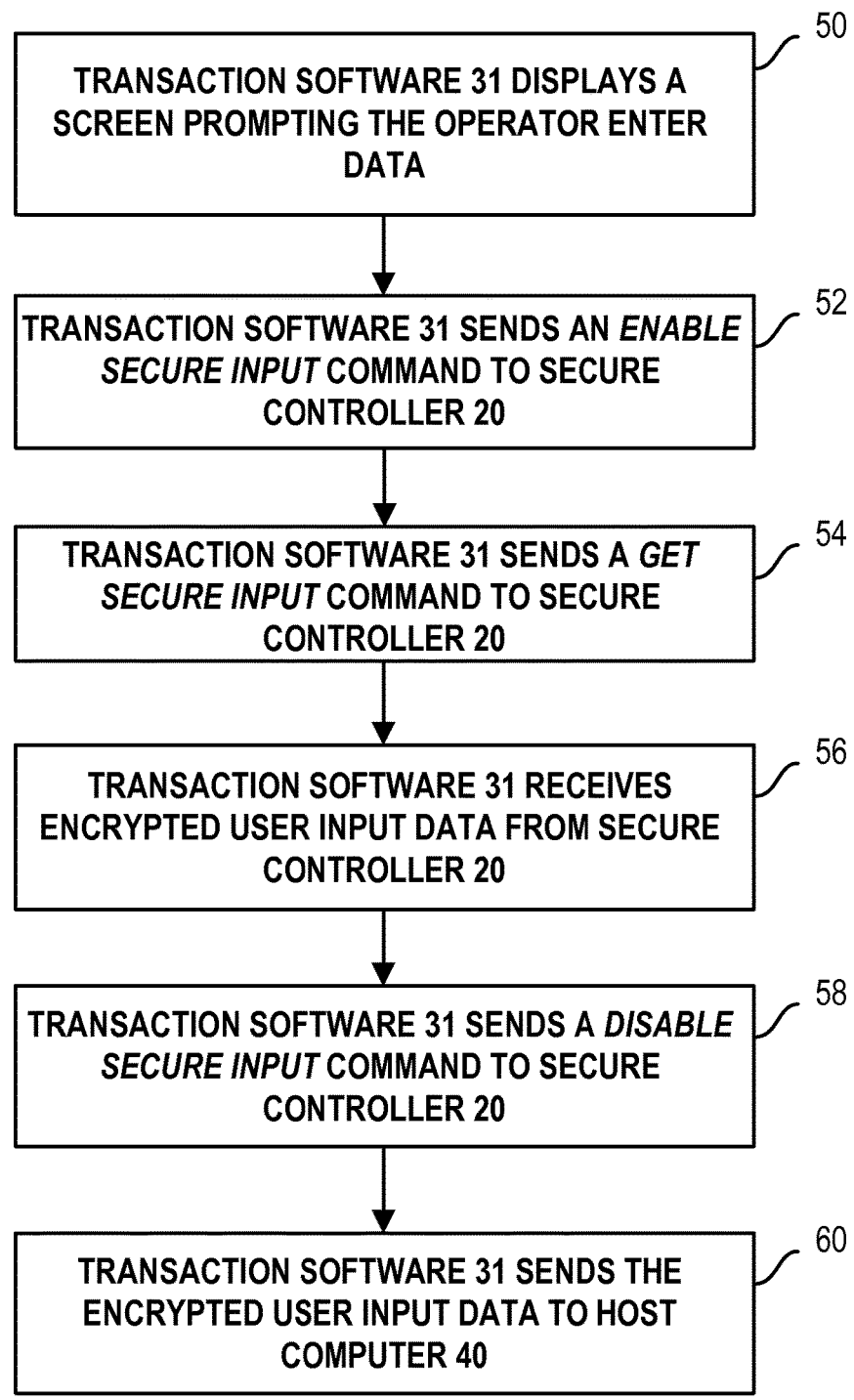
FIG. 2 is a flow diagram illustrating an example transaction data entry method.

Referring now to FIG. 2, an example transaction data entry method involving sensitive data entry begins with step 50.

In step 50, transaction software 31 displays a screen prompting an operator to enter data, such as a PIN number. This screen prompt may be displayed on display 26 (see, for example, FIG. 3).

In step 52, transaction software 31 sends one or more first commands, such as an enable secure input command to secure controller 20. In response, secure controller 20 activates backlight 24. Secure controller 20 may also enable keys 22 for input in response to the one or more first commands.

In step 54, transaction software 31 sends one or more second commands, such as a get secure input command to secure controller 20. In response, secure controller 20 gets user input data from keys 22, encrypts the user input data, and returns encrypted user input data to transaction software 31.

In step 56, transaction software 31 receives encrypted user input data from secure controller 20.

In step 58, transaction software 31 sends one or more third commands, such as a disable secure input command to secure controller 20. In response, secure controller 20 deactivates backlight 24. Secure controller 20 may also disable keys 22 in response to the one or more third commands.

If the user enters other data via a peripheral connected to secure controller 20, then secure controller 20 may also respond to a similar sequence of commands from transaction software 31 to get the user data, encrypt the user data, and return encrypted user data to transaction software 31.

In step 60, transaction software 31 sends the encrypted user input data to host computer 40.

Referring now to FIG. 3, an example embodiment of payment device 10 is illustrated. The example embodiment includes a tablet computer 70 with keys 22, backlight 24, and secure controller 20 added.

Example tablet computer 70 includes a touchscreen 72 for displaying transaction screens from transaction software 31, like screen 74. Touchscreen 72 may include an LCD.

Tablet computer 70 also includes a bezel 76 around touchscreen 72. Bezel 76 is opaque and has a predetermined color, except that areas 80 forming keys 22 are transparent or semi-transparent so that backlighting from a backlight 24 inside bezel 76 can be seen by an operator.

Keys 22 are substantially indistinguishable from the rest of bezel 76 when backlight 24 is turned off. Areas 80 are flush with the surface of bezel 76 and appear to be similar in color as the rest of bezel 76 when backlight 24 is turned off.

Keys 22 may be capacitive data entry keys and include numerals 0-9 and the function "CLR"(for clearing one or more key entries).

Transaction screen 74 may appear at a point in a transaction that requires entry of a PIN. Backlight 24 is turned on while screen 74 is displayed. Payment device 70 may also enable keys 22 at this point.

Transaction screen 74 includes a prompt with an arrow pointing to keys 22. The arrow reinforces the backlighting from backlight 24. Transaction screen 74 also includes a "Cancel"button which cancels a transaction when selected, and a "Confirm" button which completes a transaction when selected after entry of a PIN.

Selection of the Confirm button also results in transmission of encrypted PIN data to host computer 40. Payment device 70 displays another screen and turns off backlight 24. Payment device 70 may also disable keys 22 at this point.

Advantageously, including keys 22 within bezel 76 is a lower cost alternative to incorporating PIN entry keys into a display 26 or touch screen 72. Keys 22 may also be secured without impacting display 26 or touchscreen 72. Backlighting provides operators with a clear indication of where keys 22 are located, as well as, in some embodiments, when secure data entry is enabled.

Referring now to FIG. 4, another example embodiment of payment device 10 is illustrated.

This example payment device 10 includes a display device 90 with keys 22, backlight 24, secure controller 20, and communication circuitry 32. Display device 90 may include a secondary display device for use by a customer.

Example display device 90 includes a display portion 26 for displaying transaction screens and a bezel 96 around display portion 26. Display portion 26 may include an LCD.

This example payment device 10 is similar in design and operation to the payment device of FIG. 3, except that this example payment device 10 does not include controller 30. Instead, this example payment device 10 is coupled to transaction computer 100, which includes a processor and memory for executing transaction software, such as transaction software 31.

Display device 90 may include conventional video circuitry with a video port, which is coupled to a corresponding video port of transaction terminal 100 through a conventional video cable 92. Transaction terminal 100 sends transaction screens to display device 90 through the video cable 92.

Communication circuitry 32 may be separate from the video circuitry in display device 90. Thus, communication circuitry 32 may include a data port, which is coupled to a corresponding data port of transaction terminal 100 through a data cable 94. Communication circuitry 32 sends encrypted data from secure controller 20 to transaction terminal 100 and receives commands for activating and deactivating backlight 24 and enabling and disabling keys 22 from transaction terminal 100 through the data cable 94.

Although the invention has been described with particular reference to certain preferred embodiments thereof, variations and modifications of the present invention can be effected within the spirit and scope of the following claims.

What is claimed is:

1. A payment device comprising:
   a display;
   a plurality of data entry keys in an input area separate from the display for recording data during a transcription integrated into a bezel, wherein the plurality of data entry keys are flush to a surface of the bezel, wherein the data entry keys include a separate key for each digit 0-9 and a clear key;
   a backlight for illuminating the data entry keys;
   wherein the data entry keys are substantially obscured when the backlight is deactivated;
   a first controller configured to display transaction screens from transaction software during a transaction including a data entry screen during a data entry portion of the transaction, wherein the first controller executes the transaction software, and wherein the transaction software is configured to process the transaction on the first controller and based on processing the transaction: display indicators within one of the transaction screens directing attention of an operator of the payment device to the data entry keys, cause enablement of secure input on a second controller, get secure input commands from the second controller, and cause disablement of the secure input on the second controller;
   the second controller, which is a secure controller, configured to receive a first command from the transaction software during display of the data entry screen and the data entry portion of the transaction and in response thereto the second controller is configured to: display the indicators, enable the secure input, activate the backlight to reveal locations of all of the data entry keys for data entry, receive and encrypt entered data from the data entry keys by executing encryption software on the second controller, send encrypted data to the transaction software with the encrypted data sent to the transaction software responsive to getting the secure input commands requested by the transaction software, and receive a second command from the transaction software to deactivate the backlight following the data entry and the data entry portion of the transaction and to deactivate the backlight in response to the second command with the second command associated with disablement of the secure input provided by the transaction software.

2. The payment device of claim 1, wherein the data entry keys comprise capacitive data entry keys.

3. The payment device of claim 1, wherein the secure controller is also configured to enable the data entry keys from a normally disabled state for the data entry and disable the data entry keys following the data entry.

4. The payment device of claim 1, further comprising a peripheral coupled to the secure controller, wherein the secure controller is further configured to receive and encrypt data from the peripheral.

5. The payment device of claim 1, further comprising the bezel around the display, wherein the data entry keys are located within the bezel, and wherein the data entry keys blend in with the bezel when the backlight is deactivated.

6. The payment device of claim 1, further comprising another controller configured to display transaction screens during the transaction.

7. The payment device of claim 6, wherein the other controller is also configured to receive encrypted data from the one controller and send the encrypted data to a host computer.

8. A payment device comprising:
a display portion;
a bezel around the display portion;
a plurality of data entry keys within the bezel for recording data, wherein the plurality of data entry keys are flush to a surface of the bezel, wherein the data entry keys include a separate key for each digit 0-9 and a clear key;
a backlight within the bezel for illuminating the data entry keys;
wherein all of the data entry keys within the bezel are substantially obscured when the backlight is deactivated and all of the data entry keys are illuminated when the backlight is activated for data entry;
a first controller configured to display transaction screens from transaction software during a transaction including a data entry screen during a data entry portion of the transaction, wherein the first controller executes the transaction software, and wherein the transaction software is configured to process the transaction on the first controller and based on the transaction: display indicators within one of the transaction screens directing attention of an operator of the payment device to the data entry keys, cause enablement of secure input on a second controller, get secure input commands from the second controller, and cause disablement of the secure input on the second controller;
the second controller, which is a secure controller configured to: receive a first command from the transaction software during display of the data entry screen and the data entry portion of the transaction and in response thereto the second controller is configured to: display the indicators, enable the secure input, activate the backlight to reveal locations of all of the data entry keys for data entry , encrypt the data by executing encryption software on the second controller, send encrypted data to the transaction software with the encrypted data sent to the transaction software responsive to getting the secure input commands requested by the transaction software, and receive a second command from the transaction software to deactivate the backlight following the data entry and the data entry portion of the transaction and to deactivate the backlight in response to the second command with the second command associated with disablement of the secure input provided by the transaction software.

9. The payment device of claim 8, further comprising communication circuitry for sending the encrypted data to a computer coupled to the payment device.

10. The payment device of claim 9, wherein the communication circuitry is also for receiving a first command from the computer to enable the data entry keys from a normally disabled state for data entry and a second command from the computer to disable the data entry keys following the data entry.

11. The payment device of claim 9, wherein the communication circuitry is also for receiving a first command from the computer to activate the backlight to reveal locations of the data entry keys for data entry and a second command from the computer to deactivate the backlight following the data entry.

12. The payment device of claim 8, further comprising another controller configured to complete the transaction.

13. The payment device of claim 12, wherein the other controller is configured to cause transaction screens to be displayed by the display device.

14. The payment device of claim 13, wherein the one of the transaction screens includes a prompt to enter the data.

15. The payment device of claim 12, wherein the other controller is also configured to enable the data entry keys from a normally disabled state for data entry and disable the data entry keys following the data entry.

16. The payment device of claim 12, wherein the other controller is also configured to activate the backlight to reveal locations of the data entry keys for data entry and to deactivate the backlight following the data entry.

17. The payment device of claim 12, wherein the other controller is also configured to send encrypted data from the secure controller to a host computer.

18. A tablet computer comprising:
a display portion;
a bezel around the display portion including a linear portion;
a plurality of capacitive data entry keys arranged in a line within the linear portion of the bezel for recording data during a transaction, wherein the plurality of capacitive data entry keys are flush to a surface of the bezel, wherein the data entry keys include a separate key for each digit 0-9 and a clear key;
a backlight within the bezel for illuminating the data entry keys;
wherein the data entry keys are substantially obscured when the backlight is deactivated;
a first controller configured to display transaction screens during a transaction including a data entry screen during a data entry portion of the transaction through transaction software, wherein the first controller executes the transaction software, and wherein the transaction software is configured to process the transaction on the first controller and based on the transaction: display indicators within one of the transaction screens directing attention of an operator of the tablet computer to the data entry keys, cause enablement of secure input on a second controller, get secure input commands from the second controller, and cause disablement of the secure input on the second controller; and
a second controller, which is a secure controller, configured to: receive a first command from the first controller and in response thereto the second controller is configured to: display the indicators, enable the secure input, activate the backlight during display of the data entry screen and the data entry portion of the transaction to reveal all of the locations of the capacitive data entry keys for data entry, encrypt the data by executing encryption software on the second controller, and send the encrypted data to the transaction software with the encrypted data sent to the transaction software responsive to getting the secure input commands requested by the transaction software, and receive a second command from the first controller to deactivate the backlight following the data entry and the data entry portion of the transaction and to deactivate the backlight in response to the second command with the second command associated with disablement of the secure input provided by the transaction software.

19. The tablet computer of claim 18, wherein the second controller is also configured to enable the capacitive data entry keys from a normally disabled state for data entry during display of the data entry screen and the data entry portion of the transaction and disable the capacitive data entry keys following the data entry and the data entry portion of the transaction.

20. A transaction data entry method comprising:
receiving, by a secure controller, a first command from a transaction controller configured to display transaction screens from transaction software during a transaction including a data entry screen during a data entry portion of the transaction, wherein receiving further includes receiving the first command, by the secure controller, based on the transaction as an enable secure input command sent from the transaction software that executes on the transaction controller and after the transaction software displays indicators within one of the transaction screens directing the attention of an operator to data entry keys controlled by the secure controller;
enabling, by the secure controller, secure input responsive to the enable secure input command;
activating, by the secure controller, a backlight responsive to the enabling revealing locations of all the data entry keys for data entry by the secure controller, wherein the data entry keys are in an input area separate from a display and substantially obscured when the backlight is deactivated;
obtaining entered data from the data entry keys by the secure controller;
encrypting the entered data to form encrypted data by executing encryption software on the secure controller;
sending the encrypted data to the transaction controller by the secure controller responsive to a get secure input commands requested by the transaction software;
receiving, by the secure controller, a second command from the transaction controller in response to the entered data, the second command being to deactivate the backlight and responsive to a disable secure input command received from the transaction software; and
deactivating the backlight in response to the second command to obscure all of the data entry keys following the data entry portion of the transaction by the secure controller.

21. The method of claim 20, further comprising:
enabling the data entry keys from a normally disabled state for the data entry by the secure controller; and
disabling the data entry keys following the data entry by the secure controller.

22. The method of claim 20, wherein the data comprises a personal identification number (PIN).

23. The method of claim 20, wherein the activating step is in response to one or more first commands from the transaction controller.

24. The method of claim 21, wherein the enabling step is in response to one or more first commands from the transaction controller.

25. The method of claim 20, wherein the obtaining, encrypting, and sending steps are in response to one or more second commands from the transaction controller.

26. The method of claim 20, wherein the deactivating step is in response to one or more third commands from the transaction controller.

27. The method of claim 21, wherein the disabling step is in response to one or more third commands from the transaction controller.

28. The method of claim 20, wherein the data entry keys comprise capacitive data entry keys.

* * * * *